(No Model.)  2 Sheets—Sheet 2.
S. N. WASHBURN.
POTATO DIGGER.
No. 485,118. Patented Oct. 25, 1892.
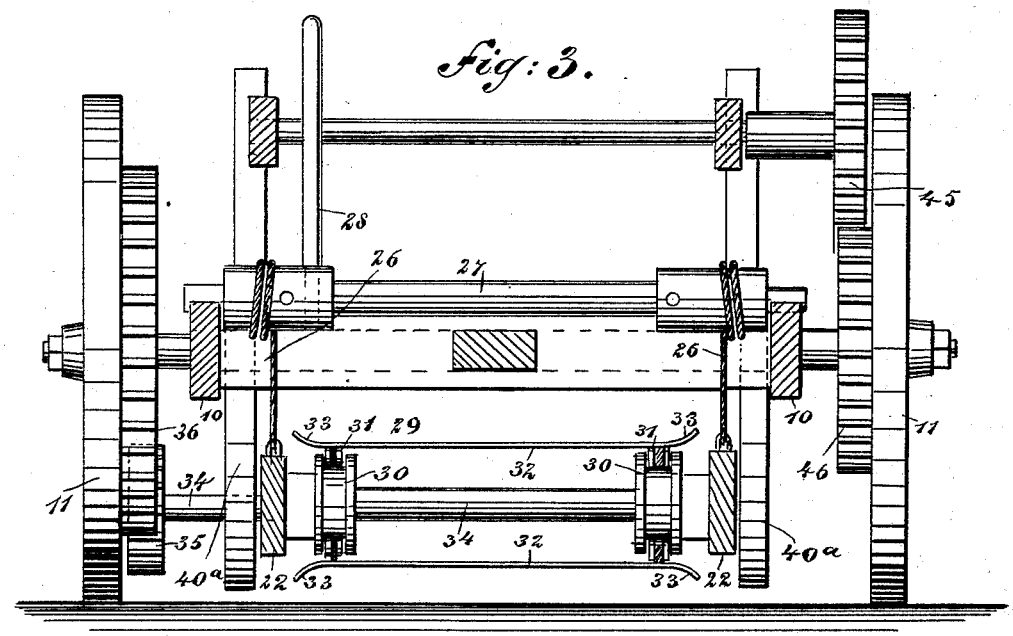
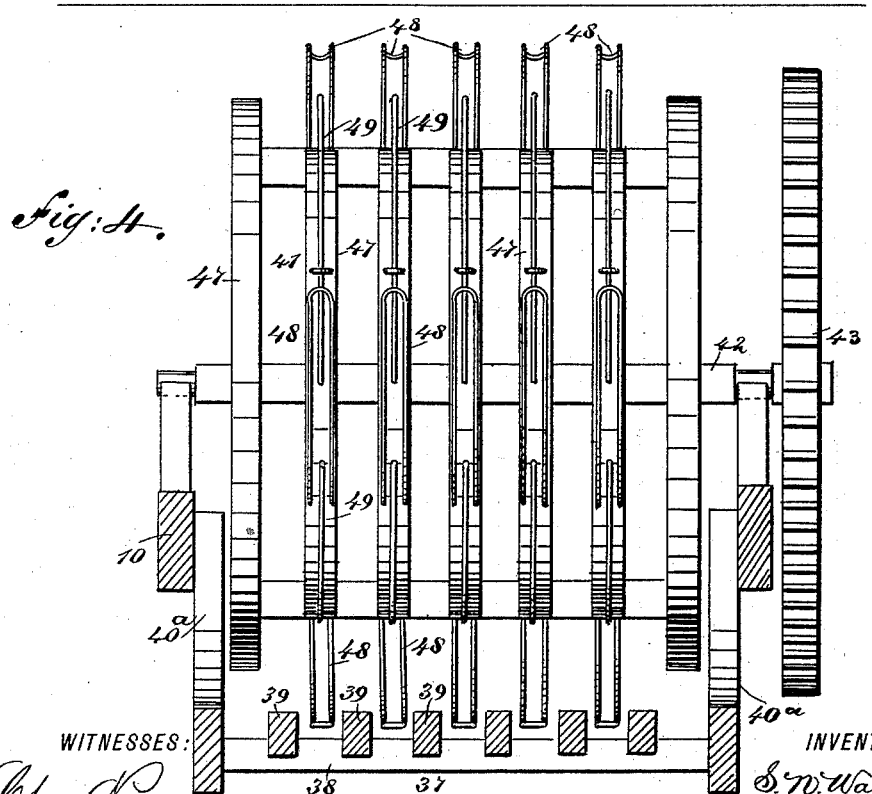
WITNESSES:
Chas. Nida
C. Sedgwick
INVENTOR
S. N. Washburn
BY Munn & Co
ATTORNEYS.

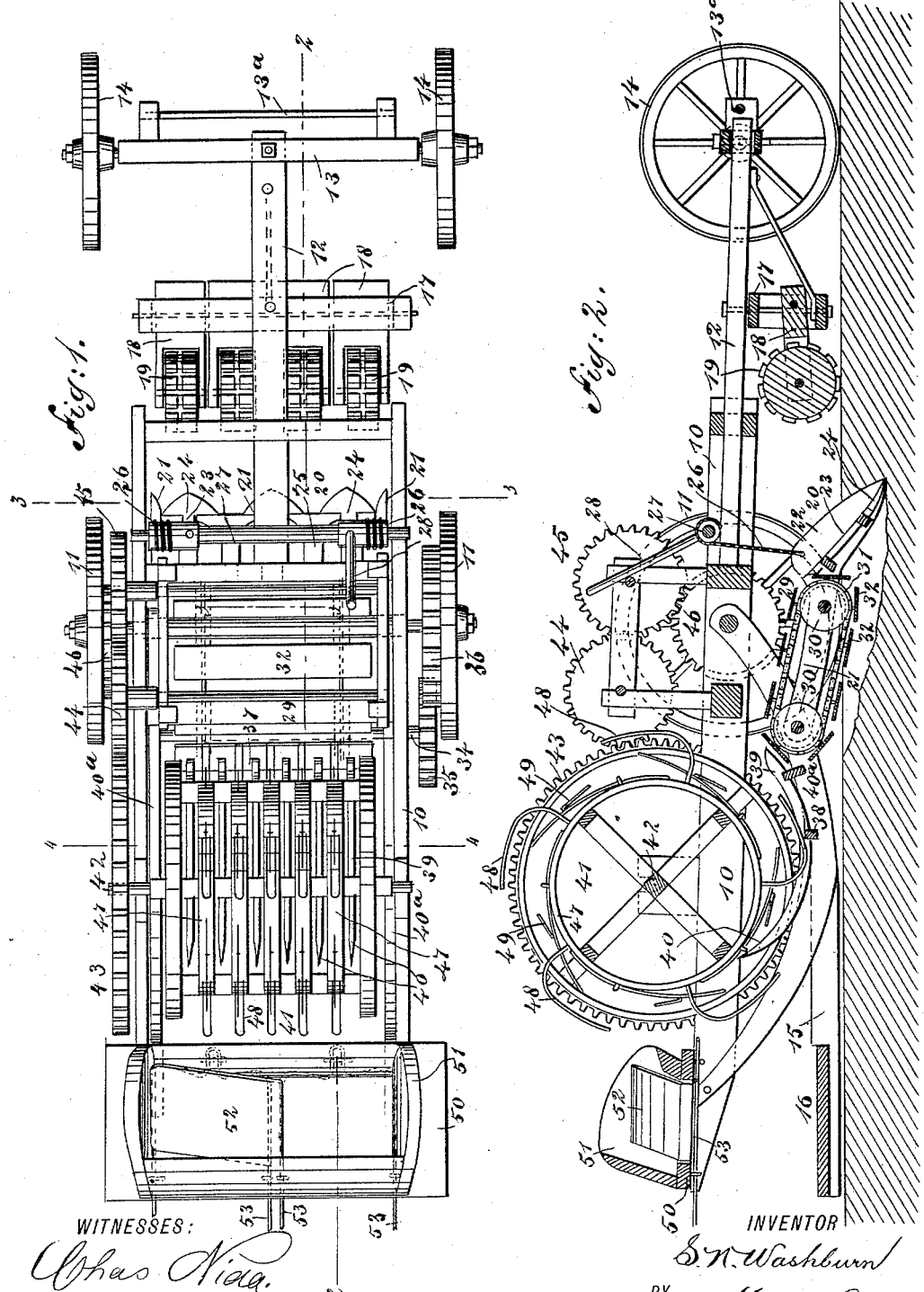

UNITED STATES PATENT OFFICE.

SAMUEL N. WASHBURN, OF LITTLE FALLS, WASHINGTON.

POTATO-DIGGER.

SPECIFICATION forming part of Letters Patent No. 485,118, dated October 25, 1892.

Application filed September 11, 1891. Renewed September 26, 1892. Serial No. 446,889. (No model.)

*To all whom it may concern:*

Be it known that I, SAMUEL N. WASHBURN, of Little Falls, in the county of Lewis and State of Washington, have invented a new and Improved Potato-Digger, of which the following is a full, clear, and exact description.

My invention relates to improvements in potato-diggers; and the object of my invention is to produce a machine which may be drawn across a potato-field and which will dig the potatoes from the ground, shake the dirt from them, separate the potatoes from the potato-vines, and deliver the potatoes into a suitable receptacle which may be prepared to receive them.

To this end my invention consists in a potato-digger, the construction of which will be hereinafter described and claimed.

Reference is to be had to the accompanying drawings, forming a part of this specification, in which similar figures of reference indicate corresponding parts in all the views.

Figure 1 is a plan view of the potato-digger. Fig. 2 is a vertical longitudinal section of the same. Fig. 3 is a vertical cross-section of the same on the line 3 3 in Fig. 1, and Fig. 4 is a vertical cross-section on the line 4 4 in Fig. 1.

The machine is provided with a main frame 10, which is mounted in wheels 11 and which has a forwardly-extending reach 12, the front end of which is secured to an axle 13, resting in wheels 14, which wheels assist in guiding the machine, and the axle 13 is provided with a common form of draw-bar 13ª to enable the power—such as a team—to be conveniently attached to the machine. If desired, a single steering-wheel may be pivoted to the reach in lieu of the two wheels and axle. Beneath the rear end of the main frame are runners 15, which support a platform 16, on which the potato-holding receptacles are placed, as hereinafter described.

Suspended from the reach 12 in the rear of the guide-wheels 14 is a rectangular frame 17, in which is pivoted a series of rearwardly-extending forks 18, in which are journaled rollers 19, which rollers have roughened faces, as shown in Figs. 1 and 2, and the rollers serve as a clod-crusher and break the soil of the potato-hills, so that the plow can easily lift the potatoes from the ground. In the rear of the clod-crusher is the plow 20, which digs the potatoes, said plow being supported in the side pieces 21, which are arranged between the main wheels 11 and which are pivoted at their rear ends, as shown in Fig. 2, and the front ends of these side pieces terminate in inclined flanges 22, which form the sides of the plow and serve as guides to direct the potatoes backward.

The plow proper is composed of a series of bars 23, which terminate in pointed heads 24, adapted to enter the ground, and between the several bars are guide-plates 25, which prevent the potatoes from falling between the plow-bars. The flanges 22 of the plow have cords 26 secured to them, and these cords extend upward over a drum-shaft 27, to which they are secured, and the drum-shaft is turned by means of a handle 28, so that by adjusting the drum-shaft the height of the plow may be regulated, and consequently the depth to which it will project into the soil.

In the rear of the plow and located between the side pieces 21 thereof is a carrier 29, which carrier has a pair of pulleys 30 mounted on suitable shafts at each end, and over these pulleys extend chain belts 31, which are connected by cross-slats 32, the said slats being turned up at the ends, as shown in Fig. 3, so that the potatoes will not roll off the sides of the carrier. The rear pulleys 30 of the carrier are secured to a driving-shaft 34, which is mounted transversely in the machine beneath the main frame, and this shaft has at one end a pinion 35 meshing with a gear-wheel 36 on one of the main wheels 11, so that the carrier will be moved whenever the machine is in operation.

In the rear of the carrier is the separator 37, which consists of transverse supporting cross-bars 38 and a series of parallel upwardly-curved bars 39, the front ends of which are a little below the rear end of the carrier and the rear ends of which extend upward and terminate in points 40, which are arranged adjacent to the lifting-wheel 41. The cross-bars 38 are secured to the curved braces 40ª, which are arranged on the sides of the machine, the front ends of the said braces being pivoted on the main axle and the rear ends being secured to the rear portion of the main frame 10. The wheel 41 is mounted on a shaft 42, which turns in bearings on the main frame 10, and this shaft has at one end a large gear-wheel 43, which meshes with an intermediate gear-wheel 44 in front of it, and this meshes with another gear-wheel 45, and the latter with a gear-wheel 46, secured to one of the main driving-wheels 11. The wheel 41 consists of a suitable framework and a series of circumferential bands 47, secured to the framework, all the bands except the two end ones having a series of hooks 48 thereon, which hooks are curved in the direction of the wheel's rotation, and between the hooks 48 are other smaller hooks 49, which are arranged to extend in the opposite direction and which serve to catch the vines and prevent them from dropping into the potato-receptacle, as described below.

The hooks 48 are preferably made of doubled wire, so that they will scoop up the potatoes, and they are adapted to project downward between the bars 39 of the separator 37 and lift the potatoes from the separator, and it will be seen that by this arrangement the dirt which has been carried to the separator with the potatoes will be entirely sifted from them. In the rear of the wheel 41 is a flat frame 50, having a receptacle or box 51 on the upper side, and the walls of this box have a forward inclination, so that the potatoes which are carried over the wheel 41 will be dropped into the box. In the center of the box is provided a guide-board 52, which is adapted to have its free end rest on one of the box ends, as shown in Figs. 1 and 2, and as the box is open at the bottom it will be seen that the potatoes may be guided to either end of the box, so as to drop through into a receptacle prepared to receive them. On the under side of the frame 50 are double pins 53, which are held in suitable keepers, and on these pins bags may be hung to receive the potatoes from the box, and the bottoms of the bags will rest upon the platform 16, which is immediately beneath the box, so that the platform will sustain the potatoes and there will be but little weight on the pins.

The operation of the machine is as follows: It is drawn across the field lengthwise of a row of potatoes and the clod-crusher having the crushing-rollers 19 will break up the soil, so that the potatoes may be easily raised. The inclined plow 20 in the rear of the crusher will project into the soil beneath the potatoes and will scoop them up and deliver them upon the carrier 29, which is directly behind the plow, and the carrier will deliver the potatoes and potato-vines into the separator 37. The wheel 41 will be turned forward by means of the gear mechanism connecting it with one of the driving-wheels 11, and the hooks 48 will raise the potatoes and vines and carry them up over the wheel. The potatoes will roll freely from the wheel and into the box 51, where they will be directed by the guide-board 52 into the potato-holding receptacle and the vines will be caught by the hooks 49 and carried downward beneath the wheel, and as they pass beneath it the projecting points 40 of the separator-bars will lift the vines from the hooks 49 and cause them to drop beneath the machine out of the way. It will thus be seen that the potatoes may be easily dug and bagged, and while the machine is especially adapted to dig potatoes it may be used for digging other vegetables.

Having thus described my invention, I claim as new and desire to secure by Letters Patent—

1. A potato-digger comprising the wheeled frame, the plow, a rearwardly-extending endless slotted carrier upon which the plow discharges, a concave separator below the frame at the delivery end of said carrier, and a lifting-wheel having two series of fingers or hooks working between the bars of the concave separator, one series of fingers serving to lift the potatoes and the other series acting in connection with the rear ends of the separator-bars to free the machine from the vines and weeds, substantially as set forth.

2. A potato-digger comprising the wheeled frame, a transverse frame suspended therefrom and provided with forks carrying a series of rolls, a plow, a rearward-extending carrier in rear thereof, a series of longitudinally-extending concave bars behind the carrier and upon which it discharges, a rotary lifting-wheel having fingers or hooks working between the rear ends of the bars, and a bag-holder or receptacle-support on the rear end of the frame, substantially as set forth.

3. The combination, with the main frame, of the clod-crusher comprising a frame suspended beneath the main frame, a series of forks pivoted in the crusher-frame, and a series of rollers pivoted in the forks, substantially as described.

4. A potato-digger comprising a main frame mounted in suitable wheels, an inclined plow mounted in the frame, a carrier adapted to receive the potatoes from the plow, a concaved separator to receive the potatoes from the carrier, a lifting-wheel mounted above the separator and provided with two series of hooks, one for potatoes and one for vines, a potato-box arranged in the rear of the lifting-wheel, and a gear mechanism for turning the lifting-wheel and moving the carrier, substantially as described.

5. In a potato-digger, the combination, with the separator having a series of parallel curved bars, of the revoluble lifting-wheel having potato-lifting hooks adapted to project between the bars, a series of oppositely-arranged vine-hooks, hooks secured to the circumference of the lifting-wheel, and a potato-box arranged in the rear of the lifting-wheel, substantially as described.

6. The combination, with the main frame and the lifting-wheel mounted therein, of a bottomless potato-box arranged in the rear of the wheel and provided with a transverselyswinging guide-board pivoted at its inner edge in the center of the box to swing over either half of the open bottom and close it and direct the potatoes through the other half, and a supporting-platform arranged beneath the box, substantially as described.

7. In a potato-digger, the combination, with a revoluble lifting-wheel having oppositely-arranged hooks upon its face, of the concaved separator arranged beneath the lifting-wheel, said separator having its rear end curved upward to a point adjacent to the face of the wheel, substantially as described.

SAMUEL N. WASHBURN.

Witnesses:
M. A. ROOT,
DANIEL GABY.